United States Patent [19]

Schwander et al.

[11] Patent Number: 4,585,460
[45] Date of Patent: Apr. 29, 1986

[54] REACTIVE DYES, PROCESS FOR THEIR PREPARATION AND USE THEREOF: BIS-VINYL OR SUBSTITUTED ETHYL SULPHENYL AZO REACTIVE DYES FOR TEXTILES

[75] Inventors: Hansrudolf Schwander, Riehen; Jürgen Markert, Ettingen; Peter Aeschlimann, Allschwil, all of Switzerland

[73] Assignee: Ciba-Geigy Corporation, Ardsley, N.Y.

[21] Appl. No.: 537,661

[22] Filed: Sep. 30, 1983

[30] Foreign Application Priority Data

Sep. 30, 1982 [CH] Switzerland .................. 5754/82

[51] Int. Cl.¹ .................. C09B 62/51; D06P 3/66
[52] U.S. Cl. .................. 8/549; 8/682;
8/688; 8/918; 8/543; 534/581; 534/582;
534/641; 534/642; 534/751; 534/844; 534/845;
564/305; 564/440
[58] Field of Search .................. 260/205; 8/549;
534/582, 641, 642, 844, 845

[56] References Cited
U.S. PATENT DOCUMENTS 3,531,459 9/1970 Chiddix et al. .................. 8/549
3,655,642 4/1972 Meininger et al. .................. 534/642
4,283,196 8/1981 Wenghoefer et al. .................. 8/531

OTHER PUBLICATIONS

Venkataraman's "The Chemistry of Synthetic Dyes," vol. VI, (Academic Press), 1972, p. 375.

*Primary Examiner*—A. Lionel Clingman
*Attorney, Agent, or Firm*—Wenderoth, Lind & Ponack

[57] ABSTRACT

Reactive dyes of the formula

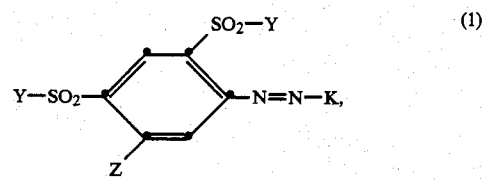

wherein Y is a $-CH=CH_2$ or $-CH_2CH_2-X$ radical, in which X is a leaving group, and Z is hydrogen, halogen, $C_1-C_4$alkyl, $C_1-C_4$alkoxy or carboxy, and K is the radical of a coupling component which couples at $pH \leq 7$, are suitable for dyeing and printing textile fibre material and give dyeings and prints of good fastness properties.

14 Claims, No Drawings

REACTIVE DYES, PROCESS FOR THEIR PREPARATION AND USE THEREOF: BIS-VINYL OR SUBSTITUTED ETHYL SULPHENYL AZO REACTIVE DYES FOR TEXTILES

Reactive dyes have long been widely used for dyeing and printing textiles made from fibre materials and at the present time there are available a large number of useful reactive dyes with different properties and for different utilities. In view of the ever more exacting demands made of dyeings obtained with reactive dyes with respect to economy, application technology and fastness standards, the present state of the art is in many respects not entirely satisfactory.

It is for example frequently observed that the degree of fixation is too low and the difference between degree of exhaustion and degree of fixation is too great (high soap loss), so that a substantial proportion of the reactive dye is lost in the dyeing procedure. In addition, build-up is often unsatisfactory.

It is the object of the present invention to provide novel improved reactive dyes which have high reactivity and good build-up, which can be dyed with high fixation yield, and which are suitable in particular for the exhaust process, and which produce wet-and light-fast dyeings on cellulosic fibre material. It has been found that this object is accomplished with the novel reactive dyes as defined in this speci- fication.

Accordingly, the invention provides reactive dyes of the formula

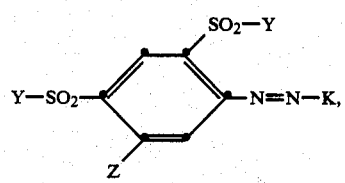

wherein Y is a —CH=CH$_2$ or —CH$_2$CH$_2$—X radical, in which X is a leaving group, ans Z is hydrogen, halogen, C$_1$-C$_4$ alkyl, C$_1$-C$_4$ alkoxy or carboxy, and K is the radical of a coupling component which couples at a pH value of ≦7.

The leaving group X is an inorganic or organic radical which can be split off under alkaline conditions.

A suitable inorganic or organic radical which can be split off under alkaline conditions is one of the following groups which can be removed as anion:

—OSO$_3$H, —SSO$_3$H, —OCOCH$_3$, —OPO$_3$H$_2$,

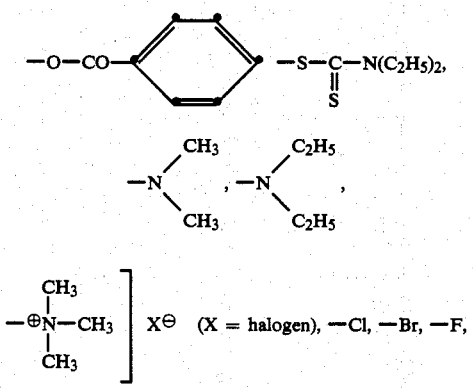

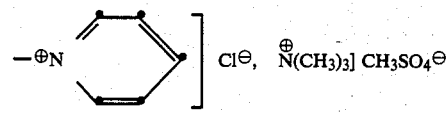

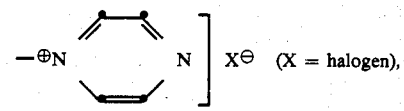

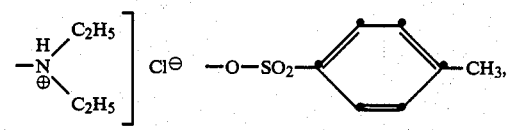

—O—SO$_2$—N(CH$_3$)$_2$, —N(CH$_3$)—SO$_2$—CH$_3$,

—O—SO$_2$—CH$_3$, —S—C≡N,

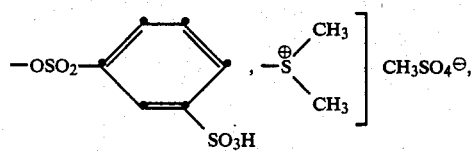

—OOCCHCl$_2$, —OOCCH$_2$Cl,

—O—O$_2$SR (R = alkyl or aryl), —O—SO$_2$—N(C$_2$H$_5$)$_2$,

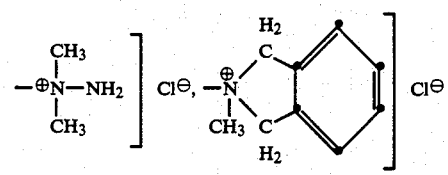

X is preferably the —OSO$_3$H radical. Both radicals Y in formula (1) can be identical or different. Preferably, both radicals Y are identical.

The substituent Z as halogen is preferably fluorine, chlorine or bromine. Z as C$_1$-C$_4$ alkyl or C$_1$-C$_4$ alkoxy is a straight chain or branched radical which may also be further substituted, e.g. by halogen, hydroxy, cyano, alkoxy, carboxy, sulfo or sulfato.

Representative examples of Z are the following substituents: methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-chloropropyl, γ-bromopropyl, sulfomethyl, β-sulfoethyl, aminosulfonylmethyl, β-sulfatoethyl, β-cyanoethyl, β-hydroxyethyl, β-hydroxybutyl, methoxy, ethoxy, propoxy, isopropoxy, butoxy, isobutoxy, sec-butoxy, tert-butoxy, β-hydroxyethoxy, β-methoxyethoxy, β-ethoxyethoxy, β-(β'-methoxyethoxy)ethoxy and β-(β'-ethoxyethoxy) ethoxy.

The radical K is the radical of a coupling component which couples at a pH value ≦7, i.e. in neutral to acid medium. Suitable coupling components are: aromatic amines, enolisable compounds and enamines, e.g. aminobenzenes, aminonaphthalenes, diphenylamines, pyrazolones, aminopyrazoles, indoles, pyridines, pyridones, pyrimidines, quinolines and acetoacetarylides.

The coupling components, e.g. those of the amino benzene series, must contain at least one sulfo group or one aliphatic sulfatable substituent, e.g. a —$C_2H_4$—OH group. The coupling components of the above mentioned classes may be further substituted in the aromatic or heterocyclic rings.

Typical examples of further substituents at the radical K are: $C_1$-$C_4$ alkyl groups such as methyl, ethyl, propyl, isopropyl and butyl; $C_1$-$C_4$ alkoxy groups such as methoxy, ethoxy, propoxy, isopropoxy and butoxy; $C_1$-$C_6$ acylamino groups such as acetylamino and propionylamino, benzoylamino, amino, $C_1$-$C_4$ alkylamino, phenylamino, $C_1$-$C_4$ alkoxycarbonyl, nitro, cyano, trifluoromethyl, halogen such as fluorine, chlorine and bromine, sulfamoyl, carbamoyl, ureido, carboxy, hydroxy, sulfomethyl and sulfo.

Coupling components containing the radical K are preferably aminobenzenes which contain an amino group of the formula —NRR' wherein each of R and R' independently is hydrogen, alkyl, cycloalkyl, aryl or aralkyl or the like.

Accordingly, suitable amino groups NRR' are: —$NH_2$, alkylamino, N,N-dialkylamino, cycloalkylamino, N,N-dicycloalkylamino, aralkylamino, arylamino groups, mixed substituted amino groups such as N-alkyl-N-cyclohexylamino and N-alkyl-N-arylamino groups; and also amino groups which contain heterocyclic radicals that may contain further fused carbocyclic rings, as well as amino groups wherein the aminonitrogen atom is a member of an N-heterocyclic ring which may contain further hetero atoms.

The alkyl radicals mentioned above may be straight chain or branched, low molecular or higher molecular. $C_1$-$C_6$ alkyl radicals are preferred. Suitable cycloalkyl, aralkyl and aryl radicals are in particular cyclohexyl, benzyl, phenethyl, phenyl and naphthyl radicals. Heterocyclic radicals are in particular furan, thiophene, pyrazole, pyridine, pyrimidine, quinoline, benzimidazole, benzthiazole and benzoxazole radicals. Suitable amino groups in which the amino-nitrogen atom is a member of an N-heterocyclic ring are preferably radicals of 6-membered N-heterocyclic compounds which may contain nitrogen, oxygen and sulfur as further hetero atoms.

The above mentioned alkyl, cycloalkyl, aralkyl and aryl radicals, the heterocyclic radicals and the N-heterocyclic rings may be further substituted, for example by halogen such as fluorine, chlorine and bromine; by cyano, trifluoromethyl, sulfamoyl, carbamoyl, $C_1$-$C_4$ alkyl, $C_1$-$C_4$ alkoxy, acetylamino, ureido, hydroxy, carboxy, sulfomethyl or sulfo.

Suitable examples of the amino group —NRR' are: —$NH_2$methylamino, ethylamino, propylamino, isopropylamino, butylamino, hexylamino, β-methoxyethylamino, γ-methoxypropylamino, β-ethoxyethylamino, N,N-dimethylamino, N,N-Diethylamino, N-methyl-N-phenylamino, N-ethyl-N-phenylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, cyclohexylamino, morpholino, Piperidino, piperazino and aromatic amino groups such as phenylamino, toluidino, xylidino, chloroanilino, anisidino, phenetidino, 2-, 3-and 4-sulfoanilino, 2,5-disulfoanilino, sulfomethylanilino, N-sulfomethylanilino, 3- and 4-carboxyphenylamino, 2-carboxy-5-sulfophenyl-amino, 2-carboxy-4-sulfophenylamino, 4-sulfonaphth-1-ylamino, 3,6-disulfonaphth-1-ylamino, 3,6,8-trisulfonaphth-1-ylamino and 4,6,8trisulfonaphth-1-ylamino.

Examples of coupling components which may be employed in the process of this invention are listed hereinafter.

Preferred subgroups of reactive dyes of the formula (1) are:

(a) reactive dyes of the formula (1) wherein Y is a —$CH_2CH_2$—X radical, in which X is sulfato;

(b) reactive dyes of the formula (1) or according to a), wherein Z is hydrogen or chlorine;

(c) reactive dyes of the formula (1) or according to a) or b), wherein K is the radical of a coupling component of the aminobenzene series or of the heterocyclic series;

(d) reactive dyes according to c), wherein K is the radical of a monoor dialkylaminobenzene, wherein the alkyl moiety or moieties and the benzene nucleus may be further substituted;

(e) reactive dyes according to d), wherein K is the radical of an N-mono-$C_1$-$C_4$ alkenylaminobenzene or N,N-di-$C_1$-$C_4$ alkenylaminobenzene or of an N-mono-$C_1$-$C_4$ alkylaminobenzene or N,N-di-$C_1$-$C_4$alkylaminobenzene, wherein the alkyl moiety or moieties may be substituted by hydroxy, sulfo, sulfato, cyano, chlorine, phenyl, sulfophenyl, sulfatoethyl aminocarbonyl, N-$C_1$-$C_4$ alkyl-N-sulfatoethylaminocarbonyl or N,N-disulfatoethylaminocarbonyl, and wherein the benzene nucleus may be substituted by $C_1$-$C_4$ alkanoylamino, $C_1$-$C_4$ alkylsulfonylamino, halo-$C_1$-$C_4$-alkylsulfonylamino, trifluoromethyl, halogen, cyano, $C_1$-$C_4$-alkylsulfonyl, N,N-di-$C_1$-$C_4$ alkylamionsulfonyl, phenylaminosulfonyl, sulfatoethylaminosulfonyl, N-$C_1$-$C_4$ alkyl-N-sulfatoethylaminosulfonyl, N,N-disulfatoethylaminosulfonyl, sulfo-$C_1$-$C_4$ alkylaminosulfonyl, carbamoyl, $C_1$-$C_4$ alkylaminocarbonyl, N,N-di-$C_1$-$C_4$ alkylaminocarbonyl, N-$C_1$-$C_4$ alkyl-N-sulfatoethylaminocarbonyl or N,N-di-sulfatoethylaminocarbonyl;

(f) reactive dyes according to (e) of the formula

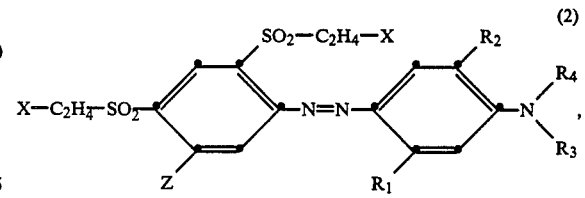

wherein X is sulfato, Z is hydrogen or chlorine, $R_1$ is hydrogen, chlorine, acetylamino, methylsulfonylamino, chloromethylsulfonylamino, trifluoromethyl, cyano, methylsulfonyl, ethylsulfonyl, n-butylsulfonyl, N,N-diethylaminosulfonyl, N,N-di-n-butylaminosulfonyl, N,N-di-sulfatoethylaminocarbonyl, N-methyl-N-sulfatoethylaminocarbonyl, N-methyl-N-sulfatoethylaminosulfonyl, sulfoethylaminosulfonyl or phenylaminosulfonyl, $R_2$ is hydrogen, methoxy or chlorine, $R_3$ is hydrogen, β-hydroxyethyl, β-sulfatoethyl, β-cyanoethyl, ethyl, benzyl, sulfobenzyl or propenyl, and $R_4$ is β-hydroxyethyl, β-sulfatoethyl, ethyl, β-(β- sulfatoethylaminocarbonyl)ethyl, β-(N-methyl-N-β-sulfatoethylaminocarbonyl)-ethyl, β-(N,N-di-β-sulfatoethylaminocarbonyl)-ethyl, β-sulfatopropyl, β,γ-disulfatopropyl, sulfoethyl, sulfopropyl, sulfobenzyl, sulfophenethyl or propenyl;

(g) reactive dyes according to (c), wherein K is the radical of an aminobenzene in which the benzene nucleus is substituted by N,N-di-hydroxyethylaminochlorotriazinylamino or N,N-di-sulfatoethylaminochlorotriazinylamino and optionally by sulfo, and wherein the amino group may be mono-$C_1$-$C_4$ alkyl- or di-N,N-$C_1$-$C_4$ alkyl- substituted;

(h) reactive dyes according to (g), of the formula

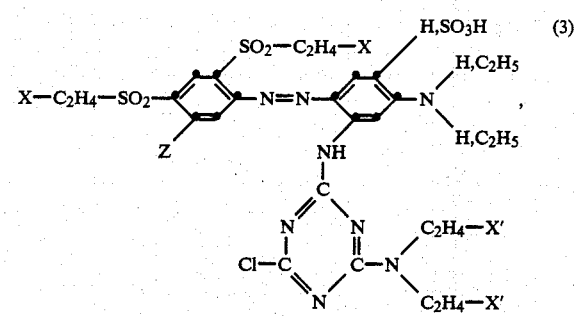

(3)

wherein X is sulfato, Z is hydrogen or chlorine and X' is sulfato. Particularly preferred reactive dyes are:

(i) reactive dyes according to (f), of the formula

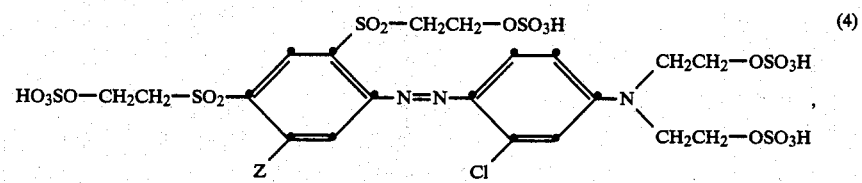

(4)

wherein Z is hydrogen or chlorine; and (j) reactive dyes according to (f), of the formula

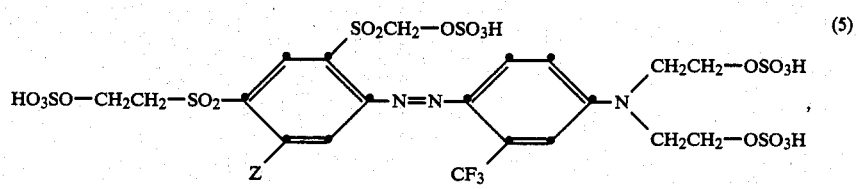

(5)

wherein Z is hydrogen or chlorine.

The dyes of formula (1) are fibre-reactive. By fibre-reactive compounds are meant those compounds which are able to react with the hydroxyl groups of cellulose or with the amino groups of natural or synthetic polyamides to form covalent chemical bonds.

The process for the preparation of the reactive dyes of formula (1) comprises diazotising a diazo component of the formula

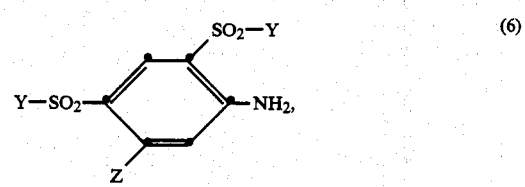

(6)

wherein Y is or —CH=$CH_2$ or $CH_2CH_2$—X radical, wherein X is a leaving group or a precursor thereof, and is as defined for formula (1), and coupling the diazonium salt to a coupling component of the formula

H—K (7)

at a pH value ≦7, and, optionally introducing the desired leaving group and/or subsequently carrying out a further conversion reaction.

In the process described above, the individual process steps can be carried out in varying sequence and in some cases may also be carried out simultaneously. Different variants of the process are thus possible. In general, the reaction is carried out stepwise in succession. In this connection, it depends on the structure of the starting materials which of the possible process variants give the best results or under which special conditions, e.g. at what temperature, the reaction shall most conveniently be carried out.

The diazotisation of the diazo component of the formula (6) is normally carried out by treatment with nitrous acid in an aqueous solution of mineral acid at low temperature, and the coupling to the coupling component of the formula (7) is carried out a neutral to acid pH values.

It is preferred to use diazo components of the formula (6), wherein Y is a —$CH_2CH_2$—X radical and X is a sulfato group. The introduction of the sulfato group as radical X is effected by sulfating the corresponding hydroxy compound, preferably by reaction with concentrated sulfuric acid at 0° C. to moderately elevated temperature. The sulfation is preferably carried out by adding the hydroxy compound to sulfuric acid monohydrate in the temperature range from 5° C. to 15° C.

The sulfation can be carried out before or after the coupling. If the radical K still contains further aliphatic bound hydroxy groups, these groups can also be converted into sulfato groups by subsequent sulfation.

The indroduction of another inorganic or organic radical for X which may be split off under alkaline conditions into a compound of the formula (1), instead of a hydroxy or sulfato group, for example a thiosulfato, methylmercapto, methylsulfonyl or phosphato group, is effected in a manner known per se.

In the monoazo compound of the formula (1) so obtained, the group X optionally can be varied by transacylation or similar reactions by hydrolysing the monoazo compound of formula (1) and then reacting the hydrolysed compound with a compound which introduces another group X.

Reactive dyes of the formula (1) or diazo components of the formula (6), wherein Y is the vinyl group —CH═CH$_2$, are obtained by splitting off sulfuric acid from the corresponding compounds in which Y is a —CH$_2$CH$_2$—X radical and X is the sulfato group. Such a splitting off reaction generally also takes place under the dyeing conditions employed for vinyl sulfone dyes.

Optionally a free amino group in the radical K can be converted after the coupling into an acylamino or alkylamino group with an acylating or alkylating agent, respectively.

A suitable acylating agent is in particular a halotriazine to which one or two alkoxy, amino, alkylamino, dialkylamino, arylamino or similar groups can already be condensed. The condensation of a coupling component of the formula (7) which still contains a free amino group with a halotriazine can also be carried out before the coupling with a diazo component of the formula (6). The replacement of one or two halogen atoms at the triazine ring by condensation with an alcohol, amine etc. can also be effected before or after the coupling. The condensation of the halotriazine with the coupling component of the formula (7) or with an alcohol, amine etc., is preferably carried out in aqueous solution or suspension, at low temperature and at a weakly acid, neutral or weakly alkaline pH value, or optionally—especially if only 1 or 2 replaceable halogen atoms still remain at the triazine ring—at elevated temperature, e.g. in the range from 50° to 100° C. The hydrogen halide set free during the condensation is conveniently neutralised by the continuous addition of an aqueous alkali metal hydroxide, carbonate or bicarbonate.

If a coupling component of the formula (7) contains a triazine radical bound through an amino group and to which an alkoxy or amino group or a similar group containing aliphatic bound hydroxyl groups is already condensed, these hydroxyl groups can likewise be converted into sulfato groups by subsequent sulfation.

The diazo components of the formula (6), wherein Y and Z are as defined for formula (1), are novel and constitute a further object of the invention.

Preferred compounds of the formula (6) those in which Y is a —CH$_2$CH$_2$—X radical, X is hydroxy or sulfato and Z is hydrogen or chlorine.

The compounds of formula (6) can be obtained by reacting di- or trihalonitrobenzenes with mercaptoethanol, oxidising the compounds so obtained to the corresponding sulfonyl compounds, reducing the nitro group to the amino group and, optionally introducing a leaving group.

A particular variant for the step of reducing the nitro group to the amino group consists in carrying out this reduction under catalytic conditions, e.g. with hydrogen under pressure and using palladium as catalyst. In this case, any halogen atoms still present are removed by reductive dehalogenation simultaneously with the reduction of the nitro group.

A further method for the preparation of compounds of formula (6) comprises reacting a halodinitrobenzene with mercaptoethanol, reacting the halo-β-hydroxyethylmercaptonitrobenzene so obtained in turn with mercaptoethanol, oxidising the resultant bis-(β-hydroxyethylmercapto)-nitrobenzene to the corresponding bis-sulfonyl compound, reducing the nitro group to the amino group and, optionally introducing a leaving group.

The di- or trihalonitrobenzenes or halodinitrobenzenes employed as intermediates may be further substituted in the benzene nucleus as indicated for formula (1). In some cases it is also possible to prepare the intermediates by nitrating substituted di- or trihalo compounds.

Typical examples of compounds of formula (6) which are suitable diazo components are:
1-amino-2,4-di-(β-hydroxyethylsulfonyl)-benzene,
1-amino-2,4-di-(β-hydroxyethylsulfonyl)-5-chlorobenzene,
1-amino-2,4-di-(β-hydroxyethylsulfonyl)-5-methylbenzene,
1-amino-2,4-di-(β-hydroxyethylsulfonyl)-5-methoxybenzene,
1-amino-2,4-di-(β-hydroxyethylsulfonyl)-5-carboxybenzene,
and the corresponding di-β-sulfato or di-β-phosphato compounds,
1-amino-2,4-di-(vinylsulfonyl)-benzene,
1-amino-2,4-di-(vinylsulfonyl)-5-chlorobenzene,
1-amino-2,4-di-(β-acetoxyethylsulfonyl)-benzene,
1-amino-2,4-di-(β-acetoxyethylsulfonyl)-5-chlorobenzene.

The coupling components of the formula (7) are known and are obtained by known methods. The following compounds are representative examples of the wide range of possible coupling components: N-ethyl-N-(β-hydroxyethyl)aniline, N-ethyl-N-(β-acetoxyethyl)aniline, 3-acetylamino-N,N-di-(β-hydroxyethyl)aniline, 3-methyl-N,N-di-(β-acetoxyethyl)aniline, 2-methoxy-5-acetylamino-N-(βacetoxyethyl)-N-benzylaniline, 2-chloro-5-acetylamino-N-(γ-phenoxy-β-hydroxy-n-propyl)aniline, 3-ureidoaniline, N-ethyl-N-(3'-sulfobenzyl)aniline, 3-methyl-N-ethyl-N-(β-sulfoethyl)aniline, 3-methyl-N,N-di-(β-hydroxyethyl)aniline, 3-methyl-6-methoxy-N,N-di-(β-hydroxyethyl)aniline, 3-acetylaminoaniline, 3-methyl-N-ethyl-N-(β-hydroxyethyl)aniline, 1-(3'-chlorophenyl)-3-methylpyrazol-5-one, 1-(2'-chloro-6'-methylphenyl)-3methylpyrazol-5-one, 1-phenyl-3-methylpyrazol-5-one 1-(2'- 3'- or 4'-sulfophenyl)-3-methylpyrazol-5-one, 1-(2'-chloro-4'- or 5'-sulfophenyl)- 3-methylpyrazol-5-one, 1-(2'-methyl-4'-sulfophenyl)-3-methyl-pyrazol-5-one, 1-[4',8'-disulfonaphth-2-yl]-3-methylpyrazol-5-one, 1-[',7'-disulfonaphth-2yl]-3-methylpyrazol-5-one, 1-(2'-chloro-5'-sulfophenyl)-3-methyl-5-aminopyrazole, 1-(2'-chloro-4'-sulfophenyl)-3-methyl-5-aminopyrazole, 1-(3'- or 4'-sulfophenyl)-3-methyl-5-aminopyrazole, acetoacetanilide.

A preferred embodiment of the process for the preparation of reactive dyes of the formula (1) comprises diazotising a diazo component of the formula

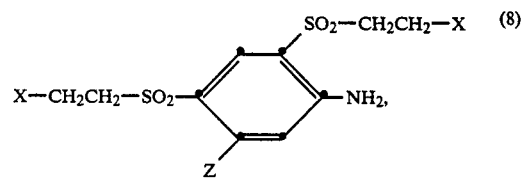

wherein X is hydroxy or sulfato and Z is hydrogen or chlorine, and coupling the diazonium compound to a coupling component of the formula

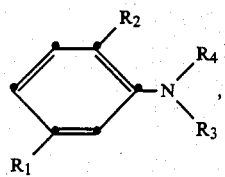
(9)

wherein $R_1$, $R_2$, $R_3$ and $R_4$ are as defined for formula (2), and, optionally, sulfating the resultant monoazo dye.

Another preferred method comprises using a coupling component of the formula

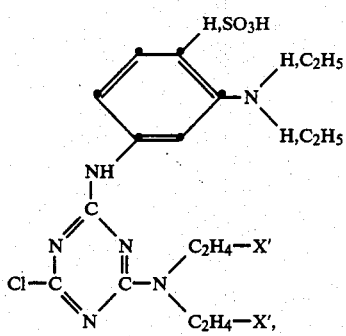
(10)

wherein X' is hydroxy or sulfato.

An advantageous method comprises preparing first a dye which contains a precursor of the reactive radical and subsequently converting it into the desired reactive radical, e.g. by esterification or by an addition reaction.

For example, it is possible to prepare a dye of the formula (1), wherein Y is a —CH$_2$CH$_2$—OH radical, and to react the intermediate with sulfuric acid, so that the hydroxy group is converted into the sulfato group; or it is possible to prepare a dye of the formula (1), wherein Y is a —CH═CH radical, and to form a —CH$_2$CH$_2$—SSO$_3$H radical by addition of thiosulfuric acid to the intermediate.

The above described synthesis route via an intermediate stage of the reactive radical proceeds in many cases uniformly and completely.

The preferred reactive dyes of the formula (4) and (5) can be prepared readily and in good yield by diazotising a diazo component of the formula

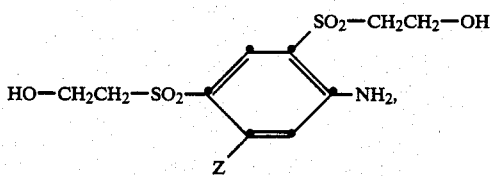
(11)

wherein Z is a hydrogen or chlorine, and coupling the diazonium compound to a coupling component of the formula

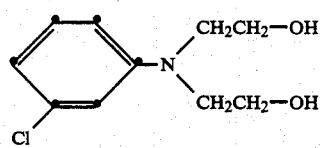
(12)

or of the formula

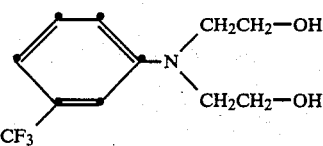
(13)

and converting the resultant monoazo compound into the tetrasulfato ester by reaction with chlorosulfonic acid in N-methylpyrrolidone.

The direct route, viz. coupling the already sulfated diazo component with the also sulfated coupling component, is also possible.

The reactive dyes of the formula (1) are suitable for dyeing and printing a very wide variety of materials, such as silk, leather, wool, polyamide fibres and polyurethanes, and especially cellulosic materials of fibrous structure, such as linen, cellulose, regenerated cellulose and, in particular, cotton. They are suitable both for the exhaust process and for the pad-dyeing process, in which the goods are impregnated with aqueous and, if appropriate, also with salt-containing dyes solutions, and the dyes are fixed after treatment with alkali or in the presence of alkali, with or without the application of heat. The reactive dyes of the formula (1) are also suitable for printing, in particular on cotton, and also for printing nitro-containing fibres, for example wool, silk or blends containing wool.

The reactive dyes of the formula (1) are particularly suitable for dyeing cotton by the exhaust process and the cold pad-batch process, the difference between degree of exhaustion and degree of fixation being remarkably small, i.e. the soap loss is insignificant.

The reactive dyes of the formula (1) are distinguished by high reactivity and good fixation. They can therefore be used for the exhaust process at low dyeing temperatures and need only be steamed briefly in the pad-steam process. The reactive dyes of the formula (1) also have good solubility. They produce dyeings of good wet- and light-fastness properties and of excellent tinctorial strength and remarkably good fibre-dye bond stability, both in acid and in alkaline medium. The dyeings are dischargeable.

It is advisable to rinse the dyeings and prints thoroughly with cold and hot water, if appropriate with the addition of an agent which acts as a dispersant and promotes the diffusion of non-fixed dye.

The preparation of the intermediates is not described in all of the following Preparatory Examples but may be readily inferred from what has been stated above.

In the following Examples parts and percentages are by weight. EXAMPLE 1

To a mixture consisting of 22.5 g of 2,4,5-trichloronitrobenzene, 15.6 g of mercaptoethanol and 90 ml of dimethylformamide are added, in portions, 11.2 g of potassium hydroxide at a temperature of 5°–10° C. The time required for this addition is about 2½ while cooling with an ice bath. The mixture is then stirred for 2 hours at the same temperature and clarified by filtration to remove precipitated potassium chloride. Dimethylformamide is removed from the filtrate by evaporation in a rotary evaporator in a water jet vacuum. To the residual yellow oil are added 250 ml of hot water, followed by the addition of NaOH with a pH of about 11, and the mixture is stirred, whereupon the product crystallises. The crystalline product is isolated by filtration, washed with water until neutral and dried in vacuo at 70° C. to give a finely crystalline yellow powder.

The crude product is purified by recrystallisation from 4 parts of n-butanol, affording the compound of the formula

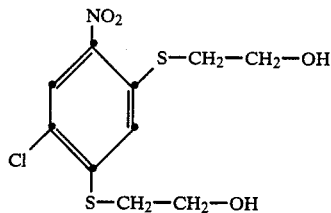

with a melting point of 153°–154° C.

The by-product of the formula

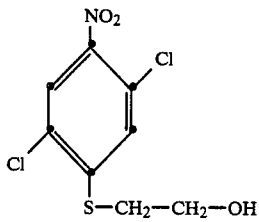

with a melting point of 106° C., can be isolated from the mother liquor of the crystallisation.

EXAMPLE 2

A mixture consisting of 2 g of tungstic acid and 800 ml of water is adjusted to pH 11.6 with sodium hydroxide solution and stirred until a solution is obtained. The pH is then adjusted to 6 with acetic acid. To the solution are added 309 g of the crude product with the main component of the formula

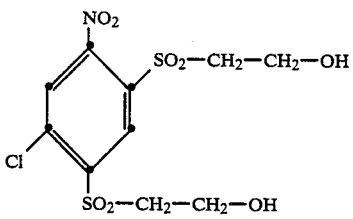

and the mixture is heated to 80° C., after which 194 g of a 35% solution of hydrogen peroxide is added at 80–85° C. After the peroxide has been used up, the temperature is raised to 93° C. and another 214 g of 35% hydrogen peroxide are added at 93–95° C. batch is then stirred for 30 minutes at reflux temperature. The product crystallises from the cooled reaction mixture and is filtered with suction, washed with water and dried in vacuo at 70° C.

The crude product is purified by crystallisation from 4 parts of n-butanol, affording the compound of the formula

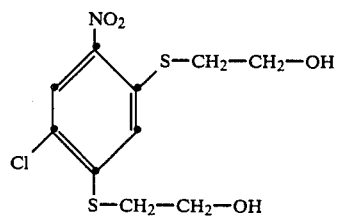

as a finely crystalline colourless powder with a melting point of 156°–157° C.

Example 3

A mixture consisting of 100 ml of water, 1 ml of concentrated hydrochloric acid, 0.5 ml of 80% acetic acid and 20 g of iron powder is stirred for 30 minutes at 95–98° C. The mixture is then diluted with 100 ml of water and 37.3 g of the compound of the formula

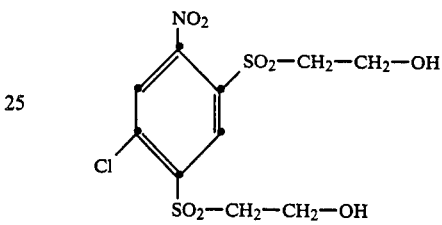

are added at 90°–95° C. over about 45 minutes. The reaction mixture is stirred for 2 hours at 90°–95° C. then cooled to 80° C., made weakly alkaline with sodium carbonate, heated again to 93° C., and filtered on a preheated suction filter while washing with a small amount of hot water. The product crystallises from the cooled filtrate and is isolated by filtration at room temperature and dried in vacuo at 70° C., affording the compound of the formula

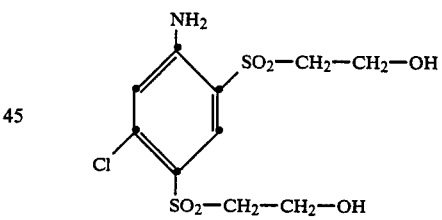

in the form of a finely crystalline colourless powder with a melting point of 176° C.

EXAMPLE 4

343 g of the compound of the formula

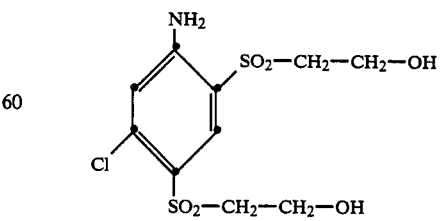

are stirred in 1200 ml of N-methylpyrrolidone and then 350 g of chlorosulfonic acid are run in at 40°–45° C. The mixture is stirred for 2 hours at 45° C. and then poured into 2400 ml of ice-water. The pH of the mixture adjusted to 5.5 with sodium bicarbonate and the methyl pyrrolidone is then extracted with methylene chloride. The aqueous phase is evaporated to dryness in vacuo at 30°–40° C. to give the compound of the formula

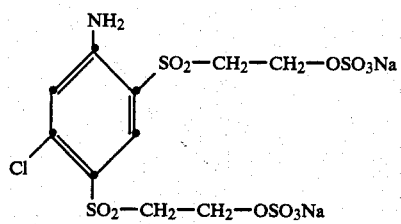

with still contains sodium sulfate.

EXAMPLE 5

To a mixture of 13.8 g of the compound of the formula

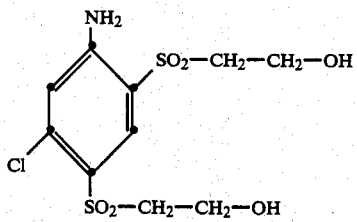

20 ml of acetic acid, 30 ml of water and 12 ml of concentrated hydrochloric acid are added 10 ml of 4N sodium nitrite solution at 0–2° C. The reaction mixture is stirred until diazotisation is complete. A small excess of nitrite is destroyed with sulfamic acid. The diazo suspension is then added to a solution, prepared at 0°–5° C., of 8.8 g of N-(bis-oxyethyl)-3-chloroaniline in 50 ml of water 11 ml of concentrated hydrochloric acid and the coupling mixture is kept for 1 hour at 0°–20° C. in the pH range from 1–2. The pH is adjusted with sodium hydroxide solution to 4 and the precipitated product is filtered with suction, washed with water and dried in vacuo at 70°–80° C. The resultant product of the formula

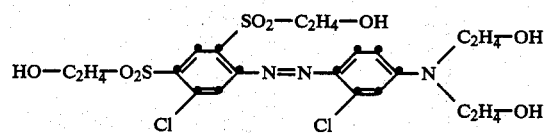

is obtained in the form of a dark red powder which forms a bluish red solution in organic solvents.

For conversion into the sulfato ester, 17 g of this compound are stirred in 80 ml of N-methylpyrrolidone, then 27.8 g of chlorosulfonic acid are added at 40°–42° C. and the mixture is stirred for 4 hours at the same temperature and then poured into 280 ml of ice-water. The pH of the resultant solution is adjusted to 5.5 with sodium bicarbonate and the methyl pyrrolidone is subsequently extracted with methylene chloride. The aqueous phase is then evaporated to dryness at 30°–40° C. in a rotary evaporator in a water jet vacuum and the residue is worked up with 250 ml of a 10% solution of potassium chloride. The precipitate is filtered with suction and the resultant dye of the formula

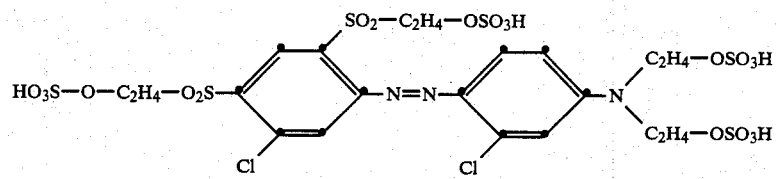

is dried in vacuo at room temperature. The dye, which is obtained in the form of the potassium salt and still contains potassium chloride, dissolves in water to form a bluish red solution.

When this dye is applied to cotton as reactive dye by the dyeing methods commonly employed for vinyl sulfone dyes, there are obtained bluish red dyeings of good fastness properties, especially good lightfastness and good acid bond stability. The dye has good build-up with excellent exhaustion and the dyeings are dischargeable to white.

When using equivalent amounts of other coupling components containing hydroxyalkyl groups instead of N-(bis-oxyethyl)-3-chloroaniline in the coupling reaction and following the same procedure and subjecting the products so obtained to sulfonation in the above described manner the dyes listed in Table I are obtained. The dyes can all be dyed on cotton by the application methods commonly employed for vinyl sulfone dyes and have similarly good properties as those of the dye obtained in this Example.

TABLE I $R = HO_3S-O-C_2H_4-O_2S-\underset{Cl}{\underset{|}{C_6H_3}}(SO_2-C_2H_4-OSO_3H)-N=N-$

| No. | | Shade on cotton |
|---|---|---|
| 1 | R–C₆H₄–N(C₂H₄–OSO₃H)(C₂H₄–OSO₃H) | bluish red |
| 2 | R–C₆H₄–N(C₂H₄–OSO₃H)(C₂H₅) | bluish red |
| 3 | R–C₆H₃(HNOC–CH₃)–N(C₂H₄–OSO₃H)(C₂H₄–OSO₃H) | reddish violet |

TABLE I-continued $$R = HO_3S-O-C_2H_4-O_2S-\underset{Cl}{\underset{|}{C_6H_3}}(SO_2-C_2H_4-OSO_3H)-N=N-$$

| No. | Structure | Shade on cotton |
|---|---|---|
| 4 | R—C₆H₂(OCH₃)(NHOC—CH₃)—N(C₂H₄—OSO₃H)₂ | bluish violet |
| 5 | R—C₆H₃(HNO₂S—CH₃)—N(C₂H₄—OSO₃H)₂ | reddish violet |
| 6 | R—C₆H₃(HNO₂S—CH₂Cl)—N(C₂H₄—OSO₃H)₂ | reddish violet |
| 7 | R—C₆H₄—N(C₂H₄—OSO₃H)(C₂H₄—CN) | red |
| 8 | R—C₆H₄—N(C₂H₄—CN)(CH₂—CH(OSO₃H)—CH₂—OSO₃H) | red |
| 9 | R—C₆H₄—N(CH₂—C₆H₅)(C₂H₄—OSO₃H) | bluish red |
| 10 | R—C₆H₄—N(CH₂—C₆H₅)(CH₂—CH(OSO₃H)—CH₂—OSO₃H) | bluish red |
| 11 | R—C₆H₃(CF₃)—N(C₂H₄—OSO₃H)₂ | red |
| 12 | R—C₆H₃(CN)—N(C₂H₄—OSO₃H)₂ | red |
| 13 | R—C₆H₃(SO₂CH₃)—N(C₂H₄—OSO₃H)₂ | bluish red |
| 14 | R—C₆H₃(SO₂C₂H₅)—N(C₂H₄—OSO₃H)₂ | bluish red |
| 15 | R—C₆H₃(SO₂—C₄H₉-n)—N(C₂H₄—OSO₃H)₂ | bluish red |
| 16 | R—C₆H₃(SO₂—N(C₂H₅)₂)—N(C₂H₄—OSO₃H)₂ | bluish red |
| 17 | R—C₆H₃(SO₂—NH—C₆H₅)—N(C₂H₄—OSO₃H)₂ | bluish red |
| 18 | R—C₆H₃(SO₂—N(C₄H₉)₂)—N(C₂H₄—OSO₃H)₂ | bluish red |
| 19 | R—C₆H₃(SO₂—N(C₂H₄—OSO₃H)₂)—N(C₂H₅)₂ | bluish red |
| 20 | R—C₆H₃(SO₂—N(C₂H₄—OSO₃H)₂)—N(CH₂—CH=CH₂)₂ | red |
| 21 | R—C₆H₃(CONH₂)—N(C₂H₄—OSO₃H)₂ | red |

TABLE I-continued $$R = HO_3S-O-C_2H_4-O_2S-\underset{Cl}{\underset{|}{\bigcirc}}-\underset{SO_2-C_2H_4-OSO_3H}{\overset{|}{\underset{N=N-}{}}}$$

| No. | Structure | Shade on cotton |
|---|---|---|
| 22 | R–⟨⟩–N(C₂H₅)(C₂H₄–OSO₃H)(C₂H₄–OSO₃H), CON(C₂H₅) | red |
| 23 | R–⟨⟩–N(C₄H₉)(C₂H₄–OSO₃H)(C₂H₄–OSO₃H), CON(C₄H₉) | red |
| 24 | R–⟨⟩–N(C₂H₅)(C₂H₅), CON(C₂H₄–OSO₃H)(C₂H₄–OSO₃H) | red |
| 25 | R–⟨⟩(CH₃)–N(C₂H₅)(C₂H₅), CON(C₂H₄–OSO₃H) | red |
| 26 | R–⟨⟩(CH₃)–N(C₂H₅)(C₂H₅), SO₂–N(C₂H₄–OSO₃H) | red |
| 27 | R–⟨⟩(Cl)–NH–C₂H₄–OSO₃H | yellowish red |
| 28 | R–⟨⟩(Cl)–NH–CH₂–CH(OSO₃H)–CH₂–OSO₃H | yellowish red |
| 29 | R–⟨⟩(Cl)–NH–C₂H₄–COHN–C₂H₄–OSO₃H | yellowish red |
| 30 | R–⟨⟩(Cl)–NH–C₂H₄–CON(CH₃)(C₂H₄–OSO₃H) | yellowish red |
| 31 | R–⟨⟩(Cl)–NH–C₂H₄–CON(C₂H₄–OSO₃H)(C₂H₄–OSO₃H) | yellowish red |
| 32 | R–⟨⟩(Cl)(HNOC–CH₃)–NH–CH₂–CH(OSO₃H)–CH₃ | red |
| 33 | R–⟨⟩(Cl)(HNOC–CH₃)–NH–CH₂–CH(OSO₃H)–CH₂–OSO₃H | red |
| 34 | R–⟨indole⟩(H₃C)(N–C₂H₄–OSO₃H) | reddish yellow |
| 35 | R–⟨indole⟩(H₃C)(N–CH₂–CH(OSO₃H)–CH₃) | reddish yellow |
| 36 | R–⟨pyridone: CH₃, CONH₂, =O, HO, N–CH₂–CH₂–OSO₃H⟩ | yellow |
| 37 | R–⟨pyridone: CH₃, CONH₂, =O, HO, N–CH₂–CH(OSO₃H)–CH₃⟩ | yellow |

The coupling components of the formulae

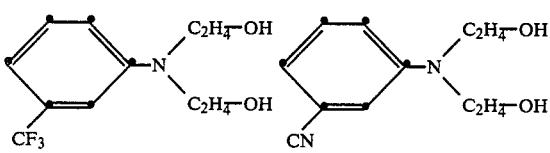
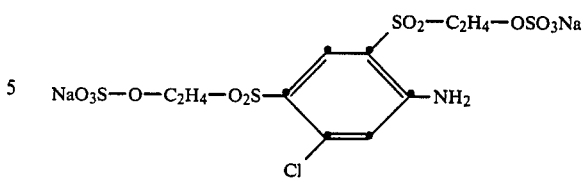

corresponding to the Examples in the table can be prepared by reacting m-trifluoromethylaniline or m-cyanoaniline with ethylene oxide, in glacial acetic acid, at 40° C.

The components containing sulfone, sulfonamide or carboxamide groups in the meta-position are obtained in analogous manner from the corresponding m-substituted anilines by alkylation with ethylene oxide or dimethyl sulfate.

Dyes having similar properties are obtained by using in these Examples equivalent amounts of the compound of the formula are dissolved at room temperature and pH 6 in 50 ml of water. To this solution are added 10 ml of 4 N sodium nitrite solution and the mixture is rapidly stirred into a mixture of 45 g of ice and 15 ml of concentrated hydrochloric acid. After stirring for 1 hour at 0°-2° C., excess nitrite is destroyed with sulfamic acid and the diazo solution is added to a solution, prepared at 0° C., of 4/100 moles of N-ethyl-N-benzylaniline-3'-sulfonic acid in 60 ml of water. The pH is raised to 3 over about 30 minutes by addition of 4 N sodium hydroxide solution, after which the coupling is complete. The pH is then adjusted to 5.5 and the dye is isolated as potassium salt by addition of potassium chloride. After it has been dried in vacuo at room temperature, the dye of the formula

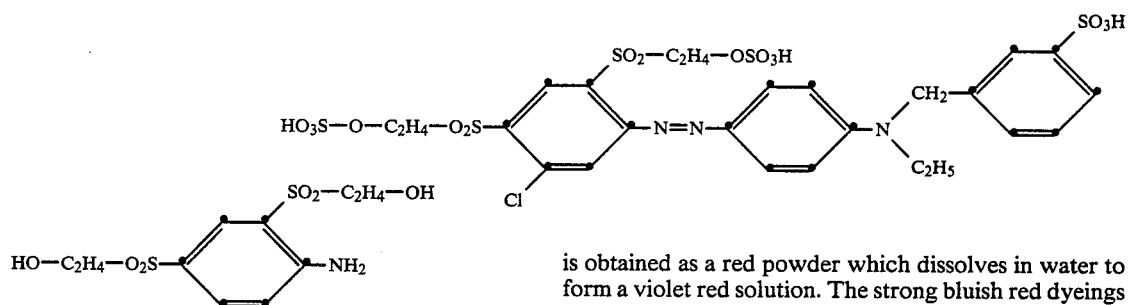

instead of the diazo component employed in Example 5 and otherwise carrying out the same procedure.

EXAMPLE 6

4/100 moles of the compound of the formula is obtained as a red powder which dissolves in water to form a violet red solution. The strong bluish red dyeings produced with this dye on cotton by the dyeing methods commonly employed for vinyl sulfone dyes have good fastness properties and the dye has very good build-up and a high degree of exhaustion.

By using equivalent amounts of the coupling components corresponding to the Examples of Table II instead of the N-ethyl-N-benzylaniline-3'-sulfonic acid and otherwise carrying out the same procedure, the dyes listed in Table II are obtained, which have similarly good fastness properties.

TABLE II

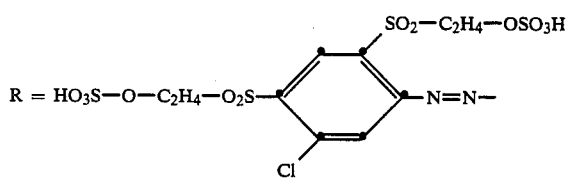

| No. | | Shade on cotton |
|---|---|---|
| 1 | 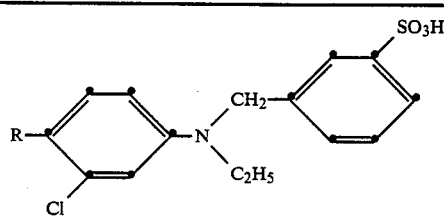 | red |

TABLE II-continued $$R = HO_3S-O-C_2H_4-O_2S-\underset{Cl}{\underset{|}{\text{C}_6H_2}}(-SO_2-C_2H_4-OSO_3H)-N=N-$$

| No. | | Shade on cotton |
|---|---|---|
| 2 | R—C$_6$H$_4$—N(CH$_2$—C$_6$H$_4$—SO$_3$H)(CH$_2$—C$_6$H$_4$—SO$_3$H) | red |
| 3 | R—C$_6$H$_4$—N(CH$_2$—C$_6$H$_5$)(CH$_2$—CH$_2$—SO$_3$H) | red |
| 4 | R—C$_6$H$_4$—N(CH$_2$—C$_6$H$_5$)(CH$_2$—CH$_2$—CH$_2$—SO$_3$H) | red |
| 5 | R—C$_6$H$_4$—N(C$_2$H$_5$)(C$_2$H$_4$—SO$_3$H) | red |
| 6 | R—C$_6$H$_4$—N(C$_2$H$_5$)(CH$_2$—CH$_2$—CH$_2$—SO$_3$H) | red |
| 7 | R—C$_6$H$_3$(Cl)—N(CH$_2$—CH$_2$—CH$_2$—SO$_3$H)$_2$ | red |
| 8 | R—C$_6$H$_3$(CF$_3$)—N(CH$_2$—CH$_2$—CH$_2$—SO$_3$H)$_2$ | red |
| 9 | R—C$_6$H$_3$(Cl)—N(CH$_2$—CH$_2$—SO$_3$H)$_2$ | red |

TABLE II-continued $$R = HO_3S-O-C_2H_4-O_2S-\underset{\underset{Cl}{|}}{\bigcirc}\overset{\overset{SO_2-C_2H_4-OSO_3H}{|}}{\underset{}{-}}N=N-$$

| No. | Structure | Shade on cotton |
|---|---|---|
| 10 | R—C₆H₃(CF₃)—N(CH₂—CH₂—SO₃H)₂ | red |
| 11 | R—C₆H₃(SO₂—NH—C₆H₅)—N(CH₂—CH₂—CH₂—SO₃H)₂ | red |
| 12 | R—C₆H₃(SO₂—NH—C₆H₅)—N(CH₂—CH₂—SO₃H)₂ | red |
| 13 | R—C₆H₃(SO₂—HN—C₂H₄—SO₃H)—N(C₂H₅)₂ | red |
| 14 | R—C₆H₄—N(C₂H₅)—CH₂—CH₂—C₆H₄—SO₃H | bluish red |
| 15 | R—C₆H₃(Cl)—NH—CH₂—C₆H₄—SO₃H | yellowish red |
| 16 | pyrazole: H₂N, R, CH₃ substituents; N—C₆H₄—SO₃H | golden yellow |

TABLE II-continued
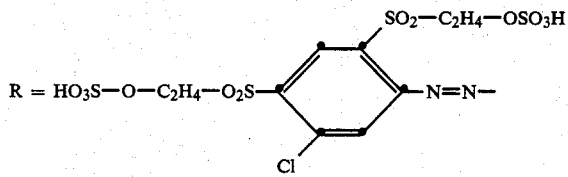
| No. | | Shade on cotton |
|---|---|---|
| 17 | | golden yellow |
| 18 | | yellow |
| 19 | | yellow |
| 20 | | yellow |
| 21 | | yellow |
| 22 | | yellow |

TABLE II-continued

R = 
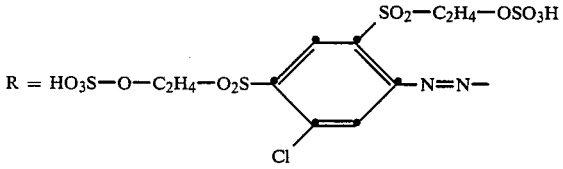

| No. | | Shade on cotton |
|---|---|---|
| 23 | 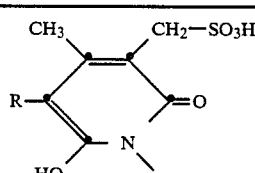 | yellow |
| 24 | 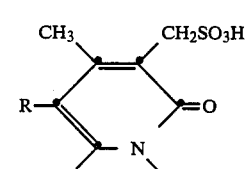 | yellow |
| 25 | 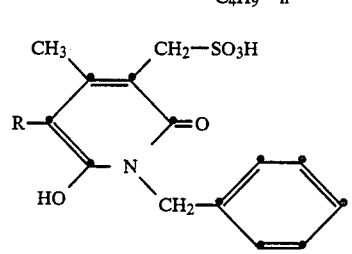 | yellow |
| 26 | 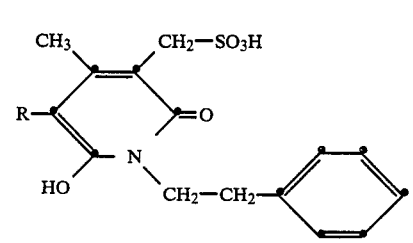 | yellow |
| 27 | 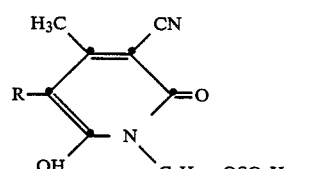 | yellow |

Dyes with similar properties are obtained by using in the foregoing Examples equivalent amounts of the compound of the formula HO₃S—O—C₂H₄—O₂S—[ring with SO₂—C₂H₄—OSO₃H and NH₂]

(obtained from bis-2,4-(oxyethyl)sulfonyl aniline by sulfation with chlorosulfonic acid in N-methylpyrrolidone) instead of the diazo component employed in Examples 6 and otherwise carrying out the same procedure.

EXAMPLE 7

A solution of 16.4 g of the compound of the formula

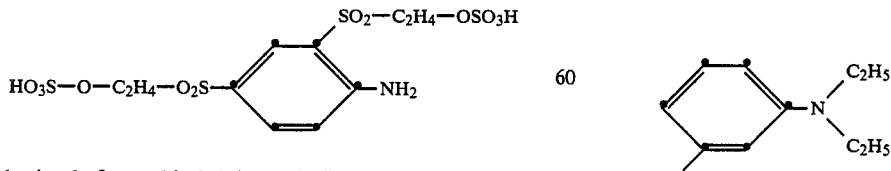

in 100 ml of methylene chloride is added at 0°–2° C. to a suspension of 20 g of cyanuric chloride in a mixture of 100 g of ice and 40 ml of water. With efficient stirring, the pH is kept in the range from 3 to 4 by adding sodium carbonate solution until the reaction of the aniline derivative is complete. Then 11.5 g of diethanolamine are added, after which the temperature is allowed to rise to 25° C. and the pH to 7. After the complete reaction of the diethanolamine, the product formed is extracted with methylene chloride. The methylene chloride solution is dried, the methylene chloride is removed in the rotary evaporator and the residue is dissolved in ethylene glycol monoethyl ether to give a solution which contains the compound of the formula

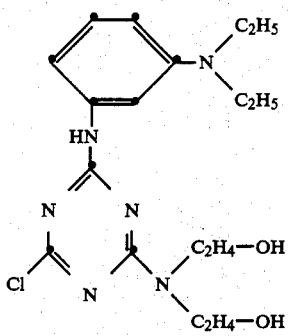

EXAMPLE 8

4/100 moles of the compound of the formula

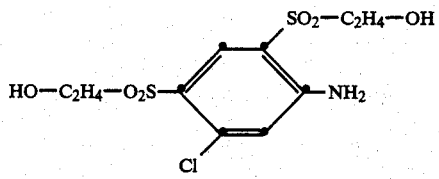

are diazotised as described in Example 5. A solution of the compound of the formula

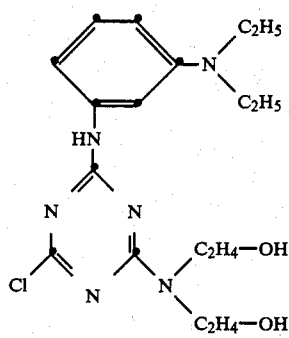

ethylene glycol monoethyl ether is added dropwise at 0°–2° C. to the diazo suspension while keeping the pH at 2–3 by addition of sodium carbonate. When the coupling is complete, the pH is raised to 4 and the mixture is diluted with water. The precipitated product of the formula

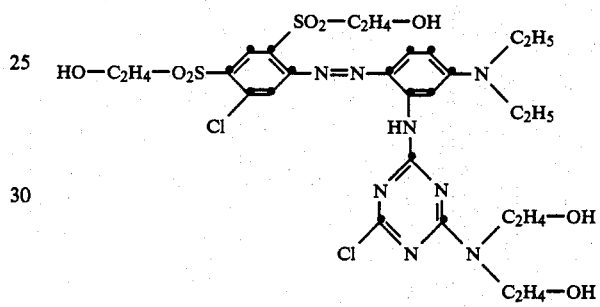

is isolated by filtration and dried in vacuo at 70° C. The product is obtained in the form of a red powder which dissolves in organic solvents to form a reddish violet solution.

EXAMPLE 9

4/100 moles of the compound of the above formula are sulfated with chlorosulfonic acid in N-methylpyrrolidone as described in Example 5. The resultant dye of the formula

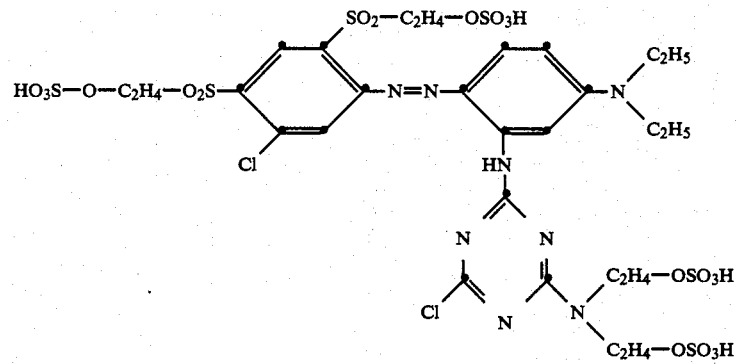

dyes cotton in a brilliant reddish violet shade of good fastness properties when it is applied by the dyeing methods commonly employed for vinyl sulfone dyes.

By using an equivalent amount of a compound of the formula

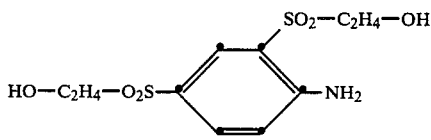

instead of the diazo component named above and otherwise carrying out the same procedure, a dye is obtained which, when applied in the same manner, also dyes cotton in a fast reddish violet shade.

EXAMPLE 10

A neutral solution of 19.8 g of 1,3-phenylenediamine-4-sulfonic acid in 120 ml of water is added at 0°–20° C. to a suspension of 20 g of cyanuric chloride in a mixture of 100 g of ice and 40 ml of water, while ensuring that the pH does not exceed 3. The reaction mixture is stirred for 20 minutes at 0°–2° C., then 100 g of ice are added and the pH is adjusted with sodium hydroxide solution to 6.5. Then 11.5 g of diethanolamine are added while keeping the pH at 6-7 and allowing the temperature to rise to 25° C., giving a solution which contains the compound of the formula

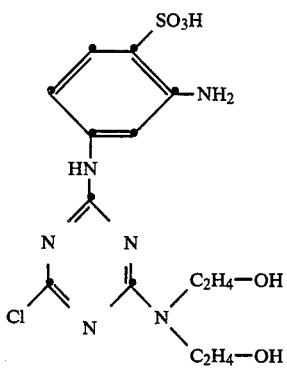

EXAMPLE 11

4/100 moles of the compound of the formula

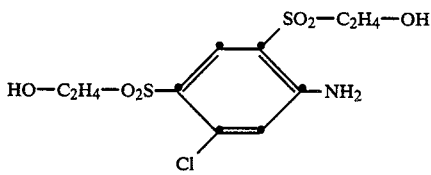

are diazotised as described in Example 5. The diazo suspension is added at 0°–2° C. a solution of 4/100 moles of the compound of the formula

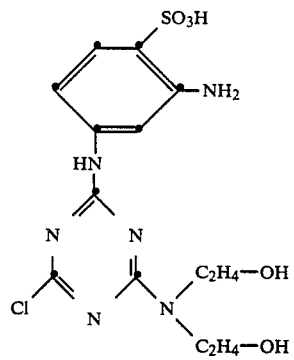

in water, while keeping the pH at 2-3 by addition of sodium carbonate. When the coupling is complete, the product formed is precipitated as sodium salt at pH 6 by addition of sodium chloride, isolated by filtration and dried in vacuo at 70° C.

The product formed of the formula

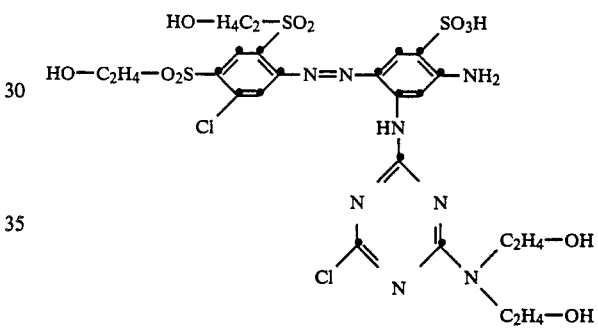

is obtained in the form of a brownish yellow powder which dissolves in water to form a reddish yellow solution.

EXAMPLE 12

4/100 moles of the compound of the above formula are sulfated with chlorosulfonic acid in N-methylpyrrolidone as described in Example 5. The resultant dye of the formula

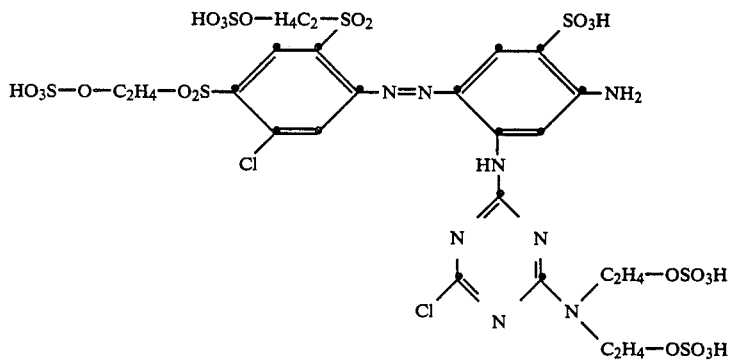

When applied by the dyeing methods commonly employed for vinyl sulfone dyes, dyes cotton in a reddish yellow shade of good fastness properties. A dye with similar properties is obtained by using an equivalent amount of 2,4-bis(oxyethyl)sulfonyl aniline instead of the diazo component employed in this Example and otherwise carrying out the same procedure.

EXAMPLE 13

4/100 moles of a diazo suspension of 2,4-bis(oxyethyl)sulfonyl-5-chloroaniline are added dropwise at 0°–2° C. to a solution of 4/100 moles of the sodium salt of phenylmethylpyrazolone-4-sulfonic acid in water, whie keeping the pH of the reaction mixture at 4 by the dropwise addition of sodium carbonate solution. When coupling is complete, the dye is salted out with sodium chloride at pH 7, isolated by filtration and dried in vacuo at 70° C. The resultant dye of the formula

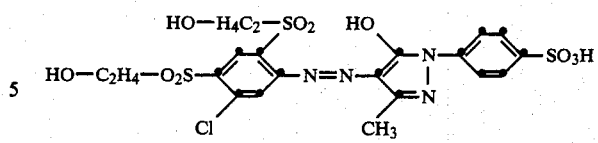

is a yellow powder which dissolves in water to form a yellow solution. Sulfation of this product with chlorosulfonic acid in N-methylpyrrolidone as described in Example 5 gives the dye of the formula

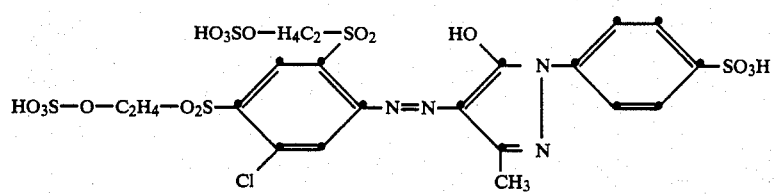

which, when applied by the dyeing methods commonly employed for vinyl sulfone dyes, dyes cotton in a reddish yellow shade of good fastness properties.

By using equivalent amounts of the pyrazolones corresponding to the following Examples of the Table in the coupling instead of phenylmethylpyrazolone-4-sulfonic acid, and otherwise carrying out the same procedure, the dyes listed in Table III below are obtained, which have similar properties.

TABLE III

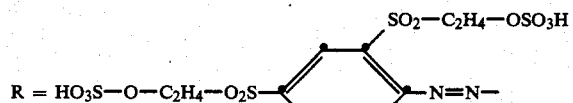

| No. | | Shade on cotton |
|---|---|---|
| 1 | HO—, R—, N-phenyl-SO₃H, =N, COOH (pyrazolone) | reddish yellow |
| 2 | HO—, R—, N-phenyl-SO₃H, =N, CH₃ (pyrazolone) | reddish yellow |
| 3 | HO—, R—, N-phenyl(SO₃H)₂, =N, CH₃ (pyrazolone) | reddish yellow |

TABLE III-continued $$R = HO_3S-O-C_2H_4-O_2S-\underset{Cl}{\underset{|}{C_6H_3}}(SO_2-C_2H_4-OSO_3H)-N=N-$$

| No. | | Shade on cotton |
|---|---|---|
| 4 | [structure with Cl, HO, R, N, CH3, SO3H, Cl] | reddish yellow |
| 5 | [structure with Cl, HO, R, N, CH3, SO3H] | reddish yellow |
| 6 | [structure with Cl, HO, R, N, CH3, CH3, SO3H] | reddish yellow |

Dyes with similarly good properties are obtained by using equivalent amounts of 2,4-bis(oxyethyl)sulfonyl aniline as diazo component in these Examples and otherwise carrying out the same procedure.

EXAMPLE 14

A solution of 123.2 g (2.2 moles) of potassium hydroxide in 350 ml of ethanol are added dropwise at 30°-35° C. over 90 minutes to a solution of 192 g (1.0 mole) of 1-nitro-2,4-dichlanobenzene and 171.6 g (2.2 moles) of 2-mercaptoethanol in 750 ml of ethanol. The reaction mixture is stirred for 1 hour at 30°-35° C. and then another 14 ml of 2-mercaptoethanol are added, followed by the addition over 30 minutes of a solution of 12 g of potassium hydroxide in 35 ml of ethanol. The yellow reaction mixture is stirred for another 3 hours at 40°-45° C. then cooled to 15°-20° C. and filtered. The filter cake is washed with water until neutral and free of chloride and dried in vacuo at 75°-80° C., affording yellow crystals of 1-nitro-2,4-bis-(β-hydroxyethyl)sulfide in a yield of 245 g (89% of theory). A sample recrystallised from alcohol melts at 120°-122° C.

220.0 g (0.8 mole) of the above sulfide are suspended in 500 ml of water and the suspension is heated, with stirring, to 80° C. Then 2 g of freshly prepared tungstic acid (prepared by dissolving an aqueous suspension of tungstic acid with NaOH and adjusting the pH with acetic acid to 5–5.5) in 30 ml of water are added and 275 ml (3.2 moles) of 35% hydrogen peroxide are added dropwise over 90 minutes. The exothermic reaction is kept at 80°-90° C. external cooling from time to time. The sulfide goes into after the addition of about ⅓ of the required hydrogen peroxide and the reaction product precipitates from the yellow solution towards the end of the dropwise addition. The batch is kept for another 6 hours at 95°-100° C. then 5 g of activated carbon are added and the hot solution is filtered. The filtrate is cooled to room temperature, whereupon 1-nitro-2,4-bis-(β-hydroxyethyl)sulfone precipitates in pale yellow crystals. The precipitate is isolated by filtration, washed with ice-water and dried in vacuo at 80° C.

Yield: 249 g (92% of theory). A sample recrystallised from alcohol melts at 176°-178° C.

13.56 g (0.04 mole) of 1-nitro-2,4-bis-(β-hydroxyethyl)sulfone are suspended in 300 ml of water and, after addition of 0.8 g of 5% Pd/C, catalytic hydrogenation is carried out with hydrogen at 80° C. and a pressure of 20 bar. Hydrogen uptake is complete after about 90 minutes. The catalyst is removed by filtration and the brownish yellow solution is concentrated to a volume of 40 ml and then cooled to 0°-5° C., whereupon the amine of the formula

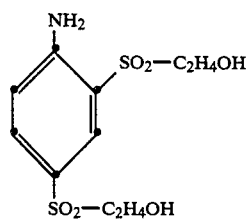

crystallises. The crystals are collected by filtration, washed with a small amount of cold water and dried in vacuo at 70°–80° C.

Yield: 10.4 g (84% of theory). The product has a melting point in the range from 116°–118° C.

The catalytic hydrogenation can also be carried out in an organic solvent, e.g. ethanol, to give the amine in comparable quality and yield as in water, after stripping off the solvent.

EXAMPLE 15

16.95 g (0.05 mole) of 1-nitro-2,4-bis-(β-hydroxyethyulsulfone in 200 ml of ethanol are catalytically hydrogenated with hydrogen under normal pressure at 35°–38° C. after addition of 0.8 g of 5% Pd/C. The hydrogenation is discontinued after 20 minutes, the catalyst is removed by filtration, and the alcoholic solution is concentrated to a volume of 120 ml. The residual solution is cooled to 5°–10° C. and the crystallised reaction product is isolated by filtration, washed with a small amount of alcohol and dried in vacuo at 80° C. According to elementary analysis and H$^1$- and C$^{13}$-nuclear resonance spectrum, the hydroxylamine of the formula

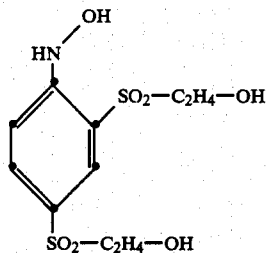

is obtained. A small sample melts at 150°–152° C. after two recrystallisations from alcohol.

56 g (0.18 mole) of the above hydroxylamine are suspended in 360 ml of water. 3.5 ml of 85% technical phosphoric acid are added and the pH is then adjusted to 6.8–7.0 with concentrated ammonia. After the addition of 6 g of Raney nickel, catalytic hydrogenation is carried out at 80° C. and under a pressure of 20 bar. When the uptake of hydrogen is complete, the catalyst is removed by filtration and the resultant solution is cooled to 0°–2° C., affording colourless crystals of the amine of the formula

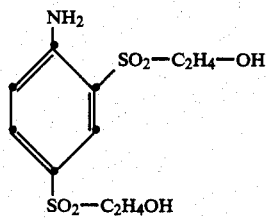

Yield: 46 g (83% of theory). Elementary analysis, melting point and spectroscopic data are in accord with those of the product obtained in Example 14.

EXAMPLE 16

8.58 g (0.11 mole of 2-mercaptoethanol are added to a solution of 4,4 g of sodium hydroxide in 15 ml of water. With efficient stirring, a solution of 20.25 g (0.1 mole) of 1-chloro-3,4-dinitrobenzene and 0.46 g of benzyltriethylammonium chloride in 40 ml of chloroform is added at room temperature and stirring is continued for 15 minutes, after which the bulk of the reaction product has precipitated. The precipitate is isolated by filtration and washed with a small amount of water and alcohol. The organic layer remaining in the filtrate is separated, dried over MgSO$_4$ and freed from solvent, to give further reaction product of the formula

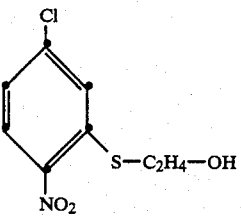

The total yield of 1-chloro-3-β-hydroxyethylmercapto-4-nitrobenzene is 18.0 g (77% of theory).

Yellow crystals with a melting point of 106°–108° C. are obtained after recrystallisation of a small sample from alcohol.

16.34 g (0.07 mole) of 1-chloro-3-β-hydroxyethymercapto-4-nitrobenzene are suspended in 180 ml of ethanol and a warm solution of 10.6 g (0.1 mole) of sodium carbonate and 7.8 g (0.1 mole) of 2-mercaptoethanol in 150 ml of water is then added. The mixture is kept for 3 hours under reflux, another 5 g of 2-mercaptoethanol are added, and the batch is kept under reflux until no more starting material can be detected by thin-layer chromatography. The reaction mixture is cooled to room temperature and inorganic salts are removed by filtration. The filtrate is concentrated and a yellow reaction product precipitates. The precipitate is taken up in water and filtered. The filter residue is dried in vacuo at 70° C., affording 15.3 g of a product which melts at 120°–122° C., (alcohol) which elementary analysis and spectroscopic data show is identical to the bis-sulfide of the formula

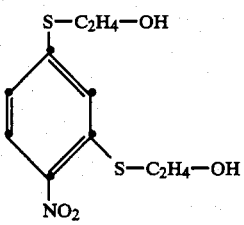

which is prepared by independent synthesis from 1-chloro-2,4-dinitrobenzene and 2-mercaptoethanol.

The further oxidation to the bis-sulfone and the reduction to the amine of the formula

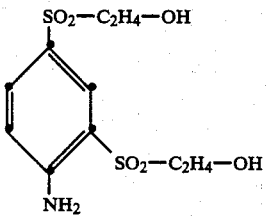

are carried out as described in Example 14.

EXAMPLE 17

74.7 g (0.2 mole) of 2,4-bis-(β-hydroxyethyl)sulfonyl-5-chloronitrobenzene are suspended in 350 ml of water. After addition of 5 g of 5% Pd/C, catalytic hydrogenation is carried out with hydrogen at 80° C. and under a pressure of 20 bar. Hydrogen uptake is complete after about 2 hours and the catalyst is then removed by filtration. The greenish, strongly acidic solution obtained is adjusted with 30% sodium hydroxide solution to pH 6.3–6.5, whereupon partial precipitation of the reaction product occurs. The batch is heated to 85°–90° C. and filtered hot after the addition of 0.5 g of activated carbon. The filtrate is cooled and the amine of the formula

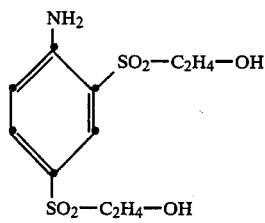

precipitates in nearly colourless crystals. The precipitate is isolated by filtration, washed with 100 ml of ice-water and dried in vacuo at 70°–80° C. Yield: 47 g (76% of theory). Elementary analysis, mixed melting point and spectroscopic data are in accord with those of the amine obtained in Example 14.

Dyeing Procedure I 2 parts of the dye obtained in Example 5 are dissolved in 100 parts of water while adding 0.5 part of sodium m-nitrobenzenesulfonate. A cotton fabric is impregnated with this solution to a liquor pick-up of 75% and then dried.

The fabric is then impregnated with a water solution of 20° C. which contains 4 g/l of sodium hydroxide and 300 g/l of sodium chloride, and then expressed to a pick-up of 75%. The dyeing is steamed for 30 seconds at 100° to 120° C., rinsed, soaped for a quarter of an hour in a 0.3% boiling solution of a non-ionic detergent, rinsed and dried.

Dyeing Procedure II 2 parts of the dye obtained in Example 5 are dissolved in 400 parts of water. To this solution are added 1500 parts of a solution containing 3 g/l of sodium chloride and 100 parts of a cotton fabric are put into this dyebath at 40° C. After 45 minutes 100 parts of a solution containing 16 g/l of sodium hydroxide and 20 g/l of calcined sodium carbonate are added. The temperature of the dyebath is kept for 45 minutes at 4° C. The dyed fabric is then rinsed, soaped for 15 minutes at the boil with a non-ionic detergent, rinsed once more and dried.

Dyeing Procedure III 4 parts of the dye obtained in Example 5 are dissolved in 50 parts of water. To this solution are added 50 parts of a solution which contains 5 g/l of sodium hydroxide and 20 g/l of calcined sodium carbonate. A cotton fabric is padded with this liquor to a pick-up of 70% and then rolled up. The cotton fabric is then stored for 3 hours at room temperature. The dyed goods are then rinsed, soaped at the boil for ¼ hour with a non-ionic detergent, rinsed once more, and dried.

Printing Procedure 3 parts of the dye obtained according to Example 5 are sprinkled, with rapid stirring, into 100 parts of a stock thickening which contains 50 parts of 5% sodium alginate thickening, 27.8 parts of water, 20 parts of urea, 1 part of sodium m-nitrobenzenesulfonate and 1.2 parts of sodium hydrogen carbonate.

A cotton fabric is printed with the printing paste so obtained and dried. The printed fabric is steamed for 2 minutes at 102° C. in saturated steam, then rinsed, if necessary soaped at the boil, then rinsed once more and subsequently dried.

What is claimed is:

1. A reactive dye of the formula

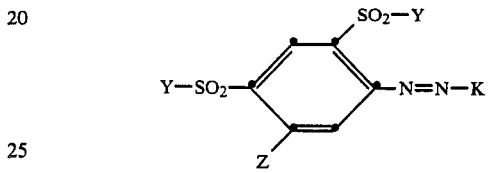

wherein Y is $-CH=CH_2$ or $-CH_2CH_2-X$, in which X is $OSO_3H$, $SSO_3H$ or $OCOCH_3$, Z is hydrogen, halogen, $C_1-C_4$Alkyl, $C_1-C_4$ alkoxy or carboxy, and K is the radical of an aminobenzene, aminonaphthalene, diphenylamine, pyrazolone, aminopyrazole, indole, pyridine, pyridone, pyrimidine, quinoline or acetoacetarylide, and K must contain at least one sulfo group or one aliphatic sulfatable substituent, and may be further substituted in the aromatic or heterocyclic rings.

2. A reactive dye according to claim 1, wherein Y is $-CH_2CH_2-X$ and X is sulfato.

3. A reactive dye according to claim 2, wherein Z is hydrogen or chlorine.

4. A reactive dye according to claim 1, wherein K is the radical of an aminobenzene.

5. A reactive dye according to claim 4, wherein K is the radical of a mono- or dialkylaminobenzene, in which the alkyl moiety or moieties and the benzene nucleus may be further subtituted.

6. A reactive dye according to claim 5, wherein K is the radical of an N-mono-$C_1-C_4$ alkenylaminobenzene or N,N-di-$C_1-C_4$alkenylaminobenzene or of an N-mono-$C_1-C_4$alkylaminobenzene or N,N-di-$C_1-C_4$alkylaminobenzene, wherein the alkyl moiety or moieties may be subtituted by hydroxy, sulfo, sulfato, cyano, chlorine, phenyl, sulfophenyl, sulfatoethylaminocarbonyl, N-$C_1-C_4$alkyl-N-sulfatoethylaminocarbonyl or N,N-di-sulfatoethylaminocarbonyl, and wherein the benezene nucleus may be substituted by $C_1-C_4$alkanoylamino, $C_1-C_4$alkylsulfonylamino, halo-$C_1-C_4$alkylsulfonylamino, trifluoromethyl, halogen, cyano, $C_1-C_4$alkylsulfonyl, N,N-di-$C_1-C_4$alkylaminosulfonyl, phenylaminosulfonyl, sulfatoethylaminosulfonyl, N-$C_1-C_4$alkyl-N-sulfatoethylaminosulfonyl, N,N-di-sulfatoethylsinosulfonyl, sulfo-$C_1-C_4$alkylaminosulfonyl, carbamoyl, $C_1-C_4$alkylaminocarbonyl, N,N-di-$C_1-C_4$alkylaminocarbonyl, N-$C_1-C_4$alkyl-N-sulfatoethylaminocarbonyl or N,N-di-sulfatoethylaminocarbonyl.

7. A reactive dye according to claim 6, of the formula

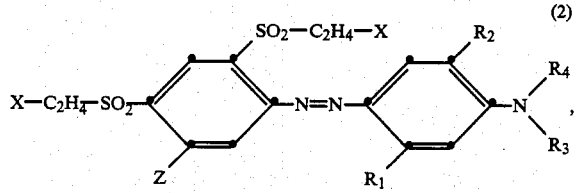

wherein X is sulfato, Z is hydrogen or chlorine, R is hydrogen, chlorine, acetylamino, methylsulfonylamino, chloromethylsulfonylamino, trifluoromethyl, cyano, methylsulfonyl, ethylsulfonyl, n-butylsulfonyl, N,N-diethylaminosulfonyl, N,N-di-n-butylaminosulfonyl, N,N-di-sulfatoethylaminocarbonyl, N-methyl-N-sulfatoethylaminocarbonyl, N-methyl-N-sulfatoethylaminosulfonyl, sulfoethylaminosulfonyl or phenylaminosulfonyl, $R_2$ is hydrogen, methoxy or chlorine, $R_3$ is hydrogen, β-hydroxyethyl, β-sulfatoethly, β-cyanoethyl, ethyl, benzyl, sulfobenzyl or propenyl, and $R_4$ is β-hydroxyethyl, β-sulfatoethyl, ethyl, β-(β-sulfatoethylaminocarbonyl)ethyl, β-(N-methyl-N-β-sulfatoethylaminocarbonyl)ethyl, β-(N,N-di-β-sulfatoethylaminocarbonyl)ethyl, β-sulfatopropyl, β,γ-disulfatopropyl, sulfoethyl, sulfopropyl, sulfobenzyl, sulfophenethyl or propenyl.

8. A reactive dye according to claim 4, wherein K is the radical of an aminobenzene in which the benzene nucleus is substituted by N,N.-di-hydroxyethylamino-chlorotriazinylamino or N,N-di-sulfatoethylamino-chlorotriazinylamino and optionally by sulfo, and wherein the amino group may be mono-$C_1$-$C_4$alkyl- or di-N,N-$C_1$-$C_4$alkyl- substituted.

9. A reactive dye according to claim 8, of the formula

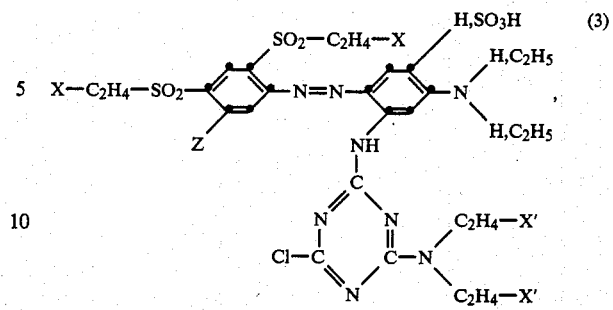

wherein X is sulfato, Z is hydrogen or chlorine and X' is sulfato.

10. A reactive dye according to claim 7, of the formula

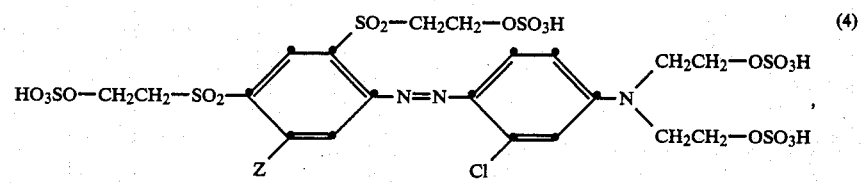

wherein Z is hydrogen or chlorine.

11. A reactive dye according to claim 7, of the formula

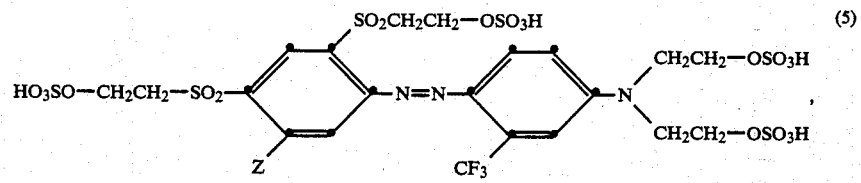

wherein Z is hydrogen or chlorine.

12. A process for preparation of a reactive dye according to claim 19, which comprises diazotising a diazo component of the formula

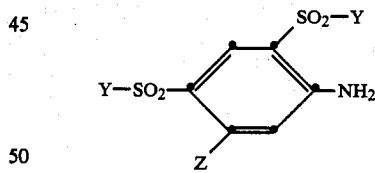

wherein Y is —CH=$CH_2$ or —$CH_2CH_2$—X, wherein X is $OSO_3H$, $SSO_3H$, $OCOCH_3$ or OH, and Z is as defined in claim 1, and coupling the diazonium salt to a coupling component of the formula

H—K wherein K is as defined in claim 19 at a pH value ≦7, and, optionally introducing the group $OSO_3H$, $SSO_3H$ or $OCOCH_3$ and/or subsequently carrying out a further conversion reaction.

13. In a process for the dyeing or printing of textile fiber material, the improvement according to which there is employed a reactive dye as defined in claim 1.

14. A process according to claim 13 wherein the textile fiber material is cellulosic fiber material.

* * * * *